(12) United States Patent
Gabelmann et al.

(10) Patent No.: US 10,578,763 B2
(45) Date of Patent: Mar. 3, 2020

(54) MODULAR ELECTRODE TOOL FOR IMPROVED HYDRAULIC FRACTURE DIAGNOSTICS

(71) Applicant: The Board of Regents of The University of Texas System, Austin, TX (US)

(72) Inventors: Jeffrey Gabelmann, Boerne, TX (US); Mark Allen Oerkfitz, San Antonio, TX (US); Thomas David Hosbach, San Antonio, TX (US); Mukul M. Sharma, Austin, TX (US); Ali Yilmaz, Austin, TX (US); Carlos Torres-Verdín, Austin, TX (US)

(73) Assignees: Board of Regents of the University of Texas System, Austin, TX (US); E-Spectrum Technologies, San Antonio, TX (US)

( * ) Notice: Subject to any disclaimer, the term of this patent is extended or adjusted under 35 U.S.C. 154(b) by 221 days.

(21) Appl. No.: 15/818,911

(22) Filed: Nov. 21, 2017

(65) Prior Publication Data

US 2018/0203154 A1    Jul. 19, 2018

Related U.S. Application Data

(60) Provisional application No. 62/518,950, filed on Jun. 13, 2017, provisional application No. 62/446,140, filed on Jan. 13, 2017.

(51) Int. Cl.
*G01V 3/34* (2006.01)
*E21B 47/12* (2012.01)
(Continued)

(52) U.S. Cl.
CPC .............. *G01V 3/34* (2013.01); *E21B 43/267* (2013.01); *E21B 47/01* (2013.01); *E21B 47/121* (2013.01);
(Continued)

(58) Field of Classification Search
CPC ... G01V 3/18; G01V 3/34; G01V 3/20; G01V 3/22; G01V 3/24; E21B 47/01;
(Continued)

(56) References Cited

U.S. PATENT DOCUMENTS 2,389,241 A    11/1945  Silverman
3,046,474 A    7/1962   Arps
(Continued)

FOREIGN PATENT DOCUMENTS

EP        1693685      10/2014
WO     2016100736      6/2016
(Continued)

*Primary Examiner* — Blake E Michener
(74) *Attorney, Agent, or Firm* — Kowert, Hood, Munyon, Rankin & Goetzel, P.C.

(57) ABSTRACT

Systems and methods for assessing physical properties of a geological formation are disclosed. The systems and methods may use electrodes that include two conductive portions separated by an isolation gap positioned along a casing in a wellbore in the formation. The electrodes may be sequentially energized to provide excitation stimulus into the formation while the remaining, non-energized electrodes may substantially simultaneously receive excitation responses to the excitation stimulus from the formation. The excitation responses may be assessed to determine one or more physical properties of fractures in the formation.

27 Claims, 10 Drawing Sheets

(51) Int. Cl.
*E21B 43/267* (2006.01)
*E21B 47/01* (2012.01)
*G01V 3/26* (2006.01)
*E21B 49/00* (2006.01)
*G01V 3/20* (2006.01)

(52) U.S. Cl.
CPC .......... *E21B 47/122* (2013.01); *E21B 47/124* (2013.01); *E21B 49/00* (2013.01); *G01V 3/20* (2013.01); *G01V 3/26* (2013.01)

(58) Field of Classification Search
CPC .... E21B 43/267; E21B 47/121; E21B 47/122; E21B 49/00
USPC ...................................................... 166/250.1
See application file for complete search history.

(56) References Cited

U.S. PATENT DOCUMENTS

| | | | |
|---|---|---|---|
| 3,057,409 A * | 10/1962 | Grossman, Jr. ....... | E21B 17/003 166/66 |
| 4,015,234 A | 3/1977 | Krebs | |
| 4,181,014 A | 1/1980 | Zuvela et al. | |
| 4,496,174 A | 1/1985 | McDonald et al. | |
| 4,684,946 A | 8/1987 | Issenmann | |
| 4,691,203 A | 9/1987 | Rbin | |
| 4,980,682 A | 12/1990 | Klein et al. | |
| 5,130,706 A | 7/1992 | Van Steenwyk | |
| 5,270,703 A | 12/1993 | Guest | |
| 5,642,051 A * | 6/1997 | Babour ................ | E21B 17/003 324/357 |
| 5,784,530 A | 7/1998 | Bridges | |
| 5,883,516 A | 3/1999 | Van Steenwyk et al. | |
| 6,184,685 B1 | 2/2001 | Paulk et al. | |
| 6,330,914 B1 | 12/2001 | Hocking et al. | |
| 6,426,917 B1 | 7/2002 | Tabanou et al. | |
| 6,725,930 B2 * | 4/2004 | Boney ................ | C09K 8/80 166/280.2 |
| 6,894,499 B2 * | 5/2005 | Dumont ................ | G01V 3/20 324/355 |
| 6,978,833 B2 | 12/2005 | Salamitou et al. | |
| 7,388,380 B2 * | 6/2008 | Chen ................ | G01V 3/265 175/50 |
| 7,424,911 B2 * | 9/2008 | McCarthy ............ | C09K 8/805 166/250.12 |
| 7,782,060 B2 * | 8/2010 | Clark ................ | E21B 47/01 175/50 |
| 8,168,570 B2 | 5/2012 | Barron et al. | |
| 8,253,417 B2 * | 8/2012 | Pislak ................ | G01V 3/22 166/250.1 |
| 8,931,553 B2 | 1/2015 | Cannan et al. | |
| 9,091,785 B2 * | 7/2015 | Donderici ............ | E21B 47/123 |
| 9,239,396 B2 | 1/2016 | Thompson et al. | |
| 9,250,351 B2 * | 2/2016 | Aldridge ................ | G01V 3/30 |
| 9,434,875 B1 * | 9/2016 | Cannan ................ | C09K 8/805 |
| 9,551,210 B2 * | 1/2017 | Bartel .................... | E21B 47/00 |
| 9,938,822 B2 * | 4/2018 | Fouda ................ | G01V 3/18 |
| 10,260,328 B2 * | 4/2019 | Jaaskelainen ......... | E21B 43/26 |
| 2001/0033164 A1 * | 10/2001 | Vinegar ................ | E21B 17/003 324/312 |
| 2005/0279495 A1 * | 12/2005 | Chen ................ | G01V 3/265 166/250.1 |
| 2006/0028208 A1 | 2/2006 | Strack et al. | |
| 2007/0256830 A1 * | 11/2007 | Entov ................ | E21B 43/26 166/250.1 |
| 2009/0005993 A1 | 1/2009 | Abubakar et al. | |
| 2009/0166024 A1 * | 7/2009 | Chen ................ | E21B 47/102 166/66 |
| 2009/0256575 A1 * | 10/2009 | Pisklak ................ | G01V 3/22 324/355 |
| 2013/0043873 A1 * | 2/2013 | Brannon ................ | G01V 3/22 324/355 |
| 2013/0154846 A1 * | 6/2013 | Mangione ................ | G01V 3/12 340/854.6 |
| 2013/0193975 A1 * | 8/2013 | Qu ............................ | G01V 3/26 324/351 |
| 2013/0197810 A1 | 8/2013 | Haas et al. | |
| 2014/0139225 A1 * | 5/2014 | Mandviwala ......... | G01V 3/26 324/344 |
| 2014/0190686 A1 | 7/2014 | Cannan et al. | |
| 2014/0338898 A1 * | 11/2014 | Allison ................ | C09K 8/805 166/254.1 |
| 2014/0374091 A1 * | 12/2014 | Wilt ...................... | E21B 49/00 166/254.1 |
| 2015/0083404 A1 * | 3/2015 | Wilt .................... | E21B 47/0905 166/250.1 |
| 2015/0219784 A1 | 8/2015 | Hibbs et al. | |
| 2015/0253459 A1 * | 9/2015 | Aldridge ................ | G01V 3/30 702/7 |
| 2016/0040519 A1 | 2/2016 | Friesen et al. | |
| 2016/0047222 A1 | 2/2016 | Bartel | |
| 2016/0069174 A1 | 3/2016 | Cannan et al. | |
| 2016/0168452 A1 | 6/2016 | Cannan et al. | |
| 2016/0201447 A1 | 7/2016 | Hoversten et al. | |
| 2016/0222283 A1 | 8/2016 | Cannan et al. | |
| 2016/0237342 A1 * | 8/2016 | Cannan ................ | C09K 8/805 |
| 2016/0282502 A1 | 9/2016 | Sharma et al. | |
| 2016/0320515 A1 * | 11/2016 | Clark ...................... | G01V 3/20 |
| 2018/0112525 A1 * | 4/2018 | Kabannik ............ | E21B 43/267 |

FOREIGN PATENT DOCUMENTS

| | | |
|---|---|---|
| WO | 2016168719 | 10/2016 |
| WO | 2017030820 | 2/2017 |

* cited by examiner

MODULAR ELECTRODE TOOL FOR IMPROVED HYDRAULIC FRACTURE DIAGNOSTICS

PRIORITY CLAIM

This patent claims priority to U.S. Provisional Patent Application No. 62/446,140 to Gabelmann et al., entitled "MODULAR ELECTRODE RESISTIVITY TOOL FOR IMPROVED HYDRAULIC FRACTURE DIAGNOSTICS", filed Jan. 13, 2017 and U.S. Provisional Patent Application No. 62/518,950 to Gabelmann et al., entitled "MODULAR ELECTRODE RESISTIVITY TOOL FOR IMPROVED HYDRAULIC FRACTURE DIAGNOSTICS", filed Jun. 13, 2017, each of which is incorporated by reference in its entirety as if fully set forth herein.

GOVERNMENT INTEREST STATEMENT

This invention was made with government support under Grant no. DE-SC0015986 awarded by the Department of Energy. The government has certain rights in the invention.

BACKGROUND OF THE INVENTION

1. Field of the Invention

Embodiments described herein relate to systems and methods for diagnostics of geological formations. More particularly, embodiments described herein relate to systems and methods for diagnostics of fractures formed during fracturing operations in geological formations.

2. Description of the Relevant Art

There are currently two typical methods that are used for fracture diagnostics in geological formations. A first method utilizes tracers (e.g., chemical tracers). Tracers, however, have the limitation of only providing information about fractures a few inches away from the borehole. Thus, information about fractures further into the formation is unavailable using tracers. A second method includes micro-seismic monitoring. Micro-seismic monitoring is a typically expensive process that measures the dimensions of created fractures but not the propped fracture length. Additionally, micro-seismic monitoring only measures the location of shear failure events and not the location of the main propped fracture that is opening in tension. Thus, both these methods fail to provide information that is of particular interest to operators such as propped fracture length and orientation along with the height of the fracture.

There has been some exploration of additional methods for fracture diagnostics in geological formations. There, however, remains a need for improved systems and methods to accomplish fracture diagnostics in wellbores that are cased and cemented.

SUMMARY

In certain embodiments, a method for assessing one or more properties of a geological formation includes energizing a first electrode that is part of a casing in a wellbore in the formation. The first electrode may include two conductive portions that are electrically separated. Energizing the first electrode may provide an excitation stimulus into the formation. A plurality of second electrodes that are part of the casing in the wellbore in the formation may receive excitation responses from the formation. The excitation responses may be responses to the excitation stimulus. At least one of the second electrodes may include two conductive portions that are electrically separated. The excitation responses may be assessed to determine one or more physical properties of at least one fracture in the formation. The fracture being assessed may be propped with conductive proppant that is electrically connected to the first electrode.

In certain embodiments, a system is configured to assess one or more properties of a geological formation. The system may include a casing in a wellbore in the formation with the casing having a plurality of electrodes. Each electrode may include two conductive portions that are electrically separated. Each electrode may be positioned at or near a fracturing point in the wellbore. An electrode driver may be moved within the casing to energize an electrode when the electrode driver is positioned at or near the electrode. The electrodes may be sequentially energized to provide excitation stimulus into the formation while substantially simultaneously receiving, in non-energized electrodes, excitation responses to the excitation stimulus from the formation. The system may be configured to assess one or more physical properties of a fractured volume of the formation based on the received excitation responses.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

Figure 1:
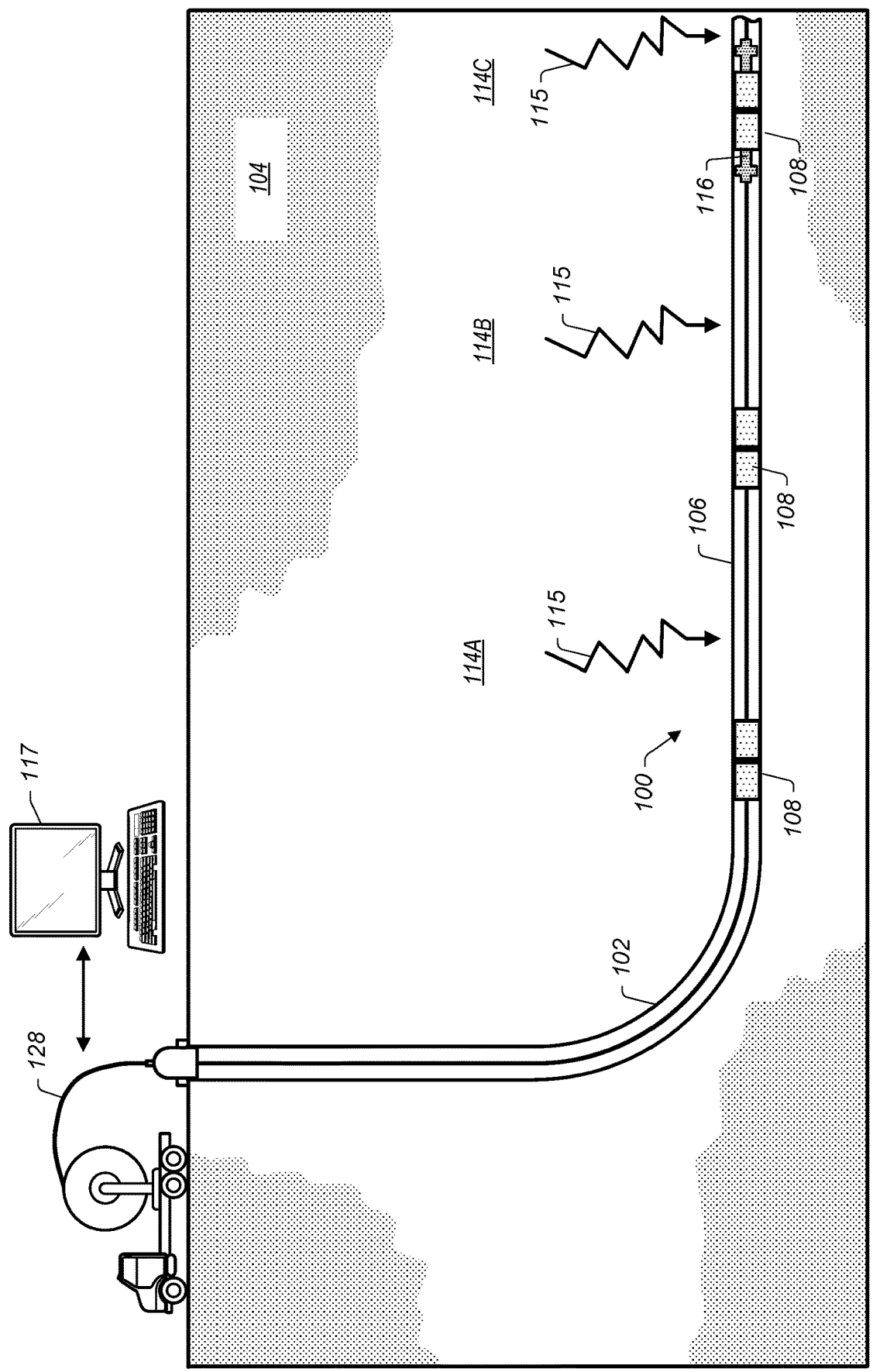
FIG. 1 depicts a representation of an embodiment of a logging tool positioned in a wellbore in the subsurface of a geological formation.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF THE PREFERRED EMBODIMENTS

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

FIG. 1 depicts a representation of an embodiment of a logging tool positioned in a wellbore in the subsurface of a geological formation. Logging tool 100 may be positioned in wellbore 102 in geological formation 104. In certain embodiments, logging tool 100 is integrated into casing 106 in wellbore 102. Casing 106 may be, for example, production casing, a liner, or other completion casing along wellbore 102. Casing 106, and logging tool 100, may be cemented or otherwise fixed in wellbore 102. In some embodiments, casing 106, and logging tool 100, may be conveyed into wellbore 102 as part of an open hole completion liner assembly. Wellbore 102 and casing 106 may be used in, for example, a fracturing operation in geological formation 104. In some embodiments, the fracturing operation includes a multistage cased-borehole fracturing operation.

Figure 2:
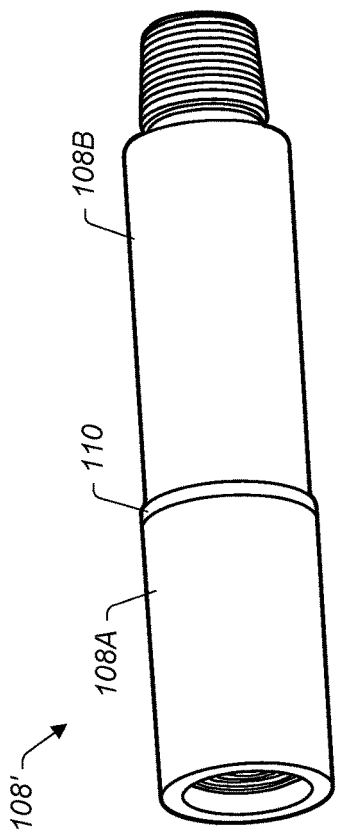
FIG. 2 depicts a representation of an embodiment of an electrode.

In certain embodiments, logging tool 100 includes an array of electrodes 108 positioned along the logging tool (and along and part of casing 106). FIG. 2 depicts a representation of an embodiment of electrode 108. Electrode 108 may be, for example, an electrode node (ENODE). In certain embodiments, electrode 108 includes isolation gap 110. Isolation gap 110 may electrically isolate two conductive portions of electrode 108 (e.g., isolation gap 110 isolates lower portion 108A and upper portion 108B). In certain embodiments, isolation gap 110 is a single gap. In some embodiments, isolation gap 110 is a dual gap or other higher number isolation gap.

In certain embodiments, upper portion 108B of electrode 108 includes transceiver module 112. Transceiver module 112 may be positioned inside electrode 108. In some embodiments, transceiver module 112 is installed in one or more slots machined in electrode 108. Transceiver module 112 may be a circuit module such as, for example, a low-power embedded EM (electromagnetic) transceiver module (LPEMT). Transceiver module 112 may include electronics for receiving signals and logging signal data (e.g., electrode node zone fracture diagnostic measurements) along with a power source for the electronics. Transceiver module 112 may also function as a communication node within a short-hop network topology (e.g., a short-hop mesh network topology), as described herein. The power source may be, for example, a battery pack (e.g., a high-energy-density battery pack) and/or a rechargeable energy storage source. In embodiments with rechargeable energy storage sources, a recharging device may be provided into casing 106 and wellbore 102 to recharge the rechargeable energy storage sources. In some embodiments, the rechargeable energy storage sources may be selectively recharged by the recharging device (e.g., recharged one at a time based on the position of the recharging device). In some embodiments, the power source for transceiver module 112 may be located separately from electrode 108. For example, power may be provided to transceiver module from a power source coupled to electrode driver 116 or another tool inserted into the wellbore to allow the power source to be inserted and removed from the wellbore.

In certain embodiments, as shown in FIG. 2, electrode 108 has a standard pin-down/box-up configuration. This configuration may allow electrodes 108 to be connected into casing 106 (e.g., connected as part of the casing), as shown in FIG. 1, using standard rig equipment during make-up and run-in of the casing. As electrodes 108 are connected into casing 106, the electrodes may be cemented into wellbore 102 as part of the casing after the casing and the electrodes are run into the wellbore.

In certain embodiments, electrodes 108 are positioned at or near planned fracturing points in wellbore 102. For example, as shown in FIG. 1, electrodes 108 may be positioned at or near transitions between fracture zones 114 (e.g., at transitions between fracture zones 114A, 114B, 114C). In certain embodiments, electrodes 108 are evenly spaced along casing 106 (e.g., the casing has substantially constant spacing between the electrodes along the casing). In some embodiments, electrodes 108 are installed near sliding sleeves at planned fracturing points in wellbore 102. With electrodes 108 positioned between fracture zones 114, the electrodes may form electrically isolated zone-electrodes within each fracture zone with the isolation provided by isolation gap 110 in each electrode. With electrodes 108 positioned between fracture zones 114 along casing 106, as shown in FIG. 1, the electrodes may be alternately used as transmit electrodes and receive electrodes during a fracture diagnostic measurement process using logging tool 100.

Figure 3:
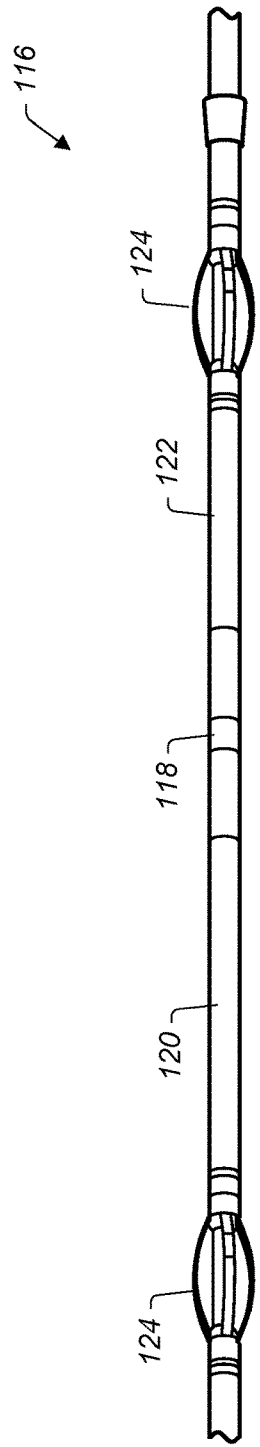
FIG. 3 depicts a representation of an embodiment of an electrode driver.

During the fracture diagnostic measurement process, electrode 108 may be used as a transmit electrode by excitation of the electrode. In certain embodiments, excitation of electrode 108 is provided by electrode driver 116. FIG. 3 depicts a representation of an embodiment of electrode driver 116. Electrode driver 116 may be, for example, an electrode driver assembly (EDRIVE).

In certain embodiments, as shown in FIG. 3, electrode driver 116 includes insulating gap 118 with EM transceiver 120 and power source 122 (e.g., battery pack). EM transceiver 120 and power source 122 may be positioned on opposite sides of insulating gap 118. In some embodiments, EM transceiver 120 and power source 122 may be located on the same side of insulating gap 118. Electrode driver 116 may include contacts 124 at each end of the driver. Contacts 124 may be, for example, bow spring contacts.

Figure 4:
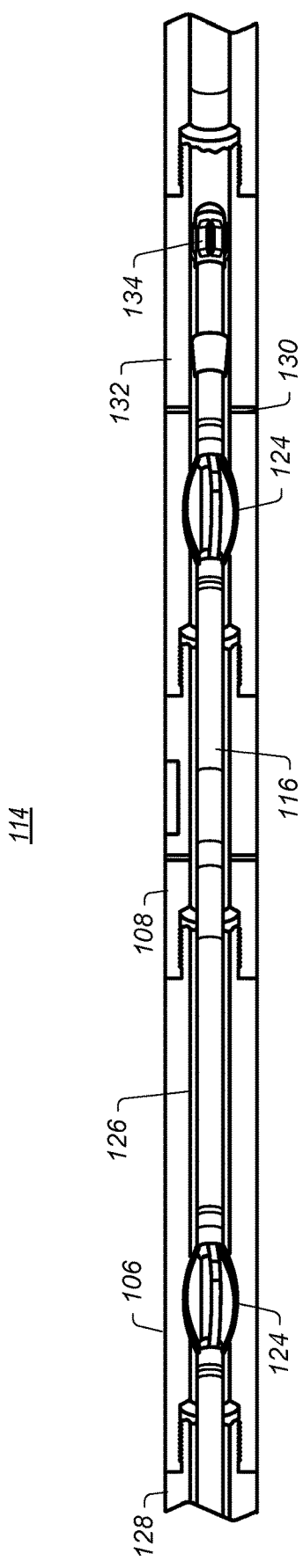
FIG. 4 depicts a representation of an embodiment of a bottom hole assembly with an electrode driver positioned in a casing.

In certain embodiments, electrode driver 116 is part of a bottom hole assembly (BHA). For example, electrode driver 116 may be included in the BHA. FIG. 4 depicts a representation of an embodiment of BHA 126 with electrode driver 116 positioned in casing 106. In some embodiments, BHA 126 is a frac-isolation assembly (FIA). Coiled tubing 128 may be coupled to BHA 126. Coiled tubing 128 may be used to insert and position BHA 126 within casing 106. In certain embodiments, BHA 126 is positioned to energize a length of casing 106 and allow fracturing operations into fracture zone 114. As shown in FIG. 4, during fracturing operations, BHA 126 may be positioned at or near fracture ports 130. Fracture ports 130 may be ports on, for example, sliding sleeve 132 in casing 106. Fracture plug 134 may provide isolation for fracture ports 130 and allow fracture fluids to be provided through the fracture ports and into fracture zone 114.

In certain embodiments, BHA 126 is moved (using coiled tubing 128) to position electrode driver 116 in a position to provide excitation of electrode 108, as shown in FIG. 4. In some embodiments, electrode driver 116 is controlled from the surface. For example, electrode driver 116 may be controlled by control unit 117, shown in FIG. 1. Control unit 117 may be, for example, a fracture diagnostic control unit (FDCU). In some embodiments, control unit 117 is coupled to electrode driver 116 via wireline connection in coiled tubing 128. The wireline connection may be, for example, an electronic coil (e.g., E-coil) embedded coiled tubing coaxial wireline connection.

In the excitation position, shown in FIG. 4, electrode driver 116 may broadcast a transmission packet (e.g., an Excitation Message Packet (EMP)). Contacts 124 may electrically couple electrode driver 116 to electrode 108 in the excitation position. Broadcast of the transmission packet may produce an excitation voltage drop across isolation gap 110 in electrode 108. The transmission packet may include a unique identifier for the broadcast (target) zone number. The unique identifier and broadcast zone number may be associated with the fracture zone for electrode 108. The transmission packet may be broadcast into the geological formation (e.g., into fracture zone 114) using electrode 108 (and conductively propped fractures electrically connected to the electrode) as a transmission antenna. The broadcasted transmission packet may propagate through the geological formation and excite the rock matrix of the geological formation (e.g., provide an excitation stimulus into the geological formation). The excitation response of the geological formation may be received (e.g., received substantially simultaneously) in the remaining electrodes 108 along casing 106 (e.g., the non-transmitting electrodes). The excitation response may be measured as a voltage drop across isolation gap 110 in each of the receiving electrodes 108. The unique identifier may be received along with the excitation response in each of the receiving electrodes 108. The unique identifier may be associated with the received excitation response to identify the transmitting electrode (and transmitting zone) in the excitation response.

Figure 5:
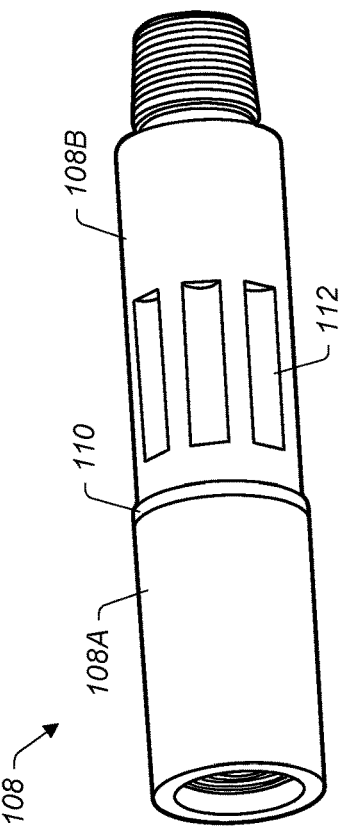
FIG. 5 depicts a representation of another embodiment of an electrode.

In some embodiments, passive electrodes may be used to receive excitation responses from the formation. Passive electrodes may be, for example, electrodes without any active electronics (e.g., electrodes without transceiver module 112, shown in FIG. 2). FIG. 5 depicts a representation of an embodiment of passive electrode 108'. Electrode 108' includes isolation gap 110 electrically separating lower portion 108A and upper portion 108B. Electrode 108' may differ from electrode 108 (shown in FIG. 2) as electrode 108' does not include transceiver module 112 or any other active electrical components (e.g., circuit modules or power sources). Removing electrical components from the electrode may reduce concerns associated with permanent installation of electronic components and power sources (e.g., batteries) in a geological formation. For example, concerns with permanent installation of hazardous materials may be reduced. In embodiments using electrode 108', a separate receiver module may be positioned at or near electrode 108' to receive excitation responses from the geological formation.

Figure 6:
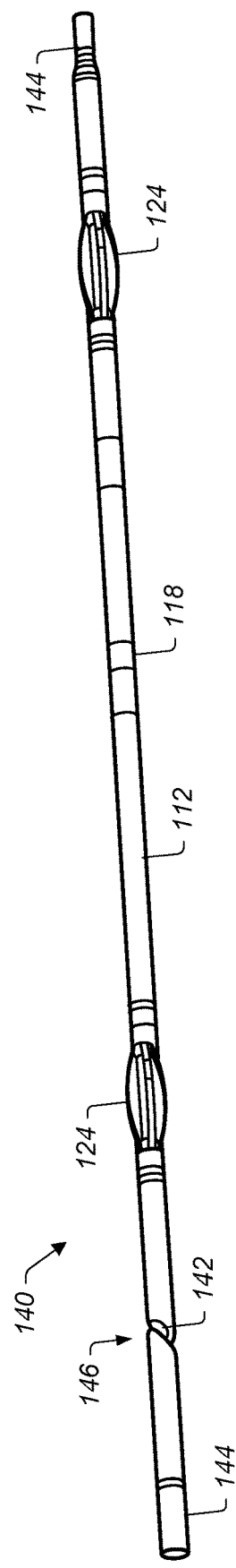
FIG. 6 depicts a representation of an embodiment of a receiver module.

FIG. 6 depicts a representation of an embodiment of receiver module 140. In certain embodiments, receiver module 140 includes insulating gap 118 with transceiver module 112 on one side of the gap. Insulating gap 118 and transceiver module 112 may be positioned between contacts 124 (e.g., bow spring contacts). Cable 142 may run internally through the length of receiver module 140. Cable 142 may be used to provide connections (e.g., power and/or transmission connections) for transceiver module 112.

In certain embodiments, receiver module 140 includes end connectors 144 at one or both ends of the receiver module. End connectors 144 may be, for example, intermodule assemblies containing rotary wet-connectors. End connectors 144 may allow receiver module 140 to be connected to additional receiver modules and/or electrode driver 116. End connectors 144 may provide electrical connection between cable 142 and the additional receiver modules and/or electrode driver 116.

In certain embodiments, receiver module 140 includes spacer bar 146. Spacer bar 146 may be, for example, a carbon fiber or other electrically insulating spacer. Spacer bar 146 may be sized to provide selected (e.g., predetermined) spacing between multiple receiver modules 140 used in an array of receiver modules. The predetermined spacing between receiver modules 140 in an array of receiver modules may be selected such that individual receiver modules are positioned properly with respect to electrodes 108' when the array is provided into casing 106.

Figure 7:
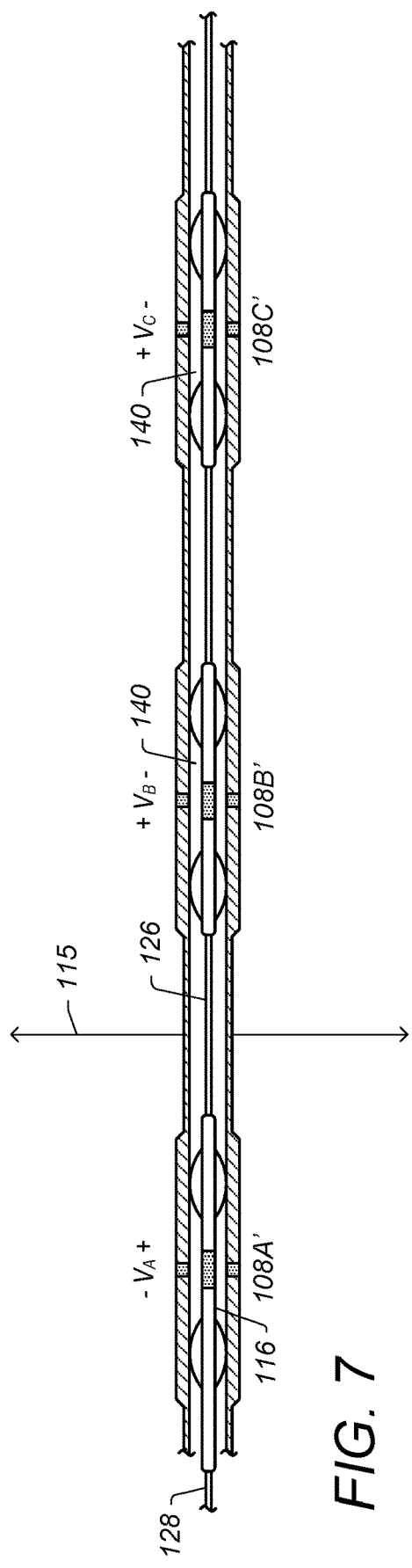
FIG. 7 depicts a representation of an embodiment of a receiver array.

FIG. 7 depicts a representation of an embodiment of receiver array 150. As shown in FIG. 7, array 150 includes two receiver modules 140 coupled to electrode driver 116 along coiled tubing 128. In certain embodiments, the two receiver modules 140 are coupled to the downhole end of electrode driver 116 (e.g., receiver modules 140 are positioned downhole of electrode driver 116 in BHA 126). It is to be understood, however, that array 150 may have any number of receiver modules in the array and that receiver modules 140 may be positioned anywhere desired within BHA 126. For example, one or more receiver modules may be positioned uphole of electrode driver 116 in addition to, or instead of, receiver modules positioned downhole of the electrode driver. Thus, array 150 may be designed to include varying numbers of receiver modules 140 with differing positions relative to electrode driver 116 depending on, for example, a particular intended use of the array.

Coiled tubing 128 may be used to position electrode driver 116 and receiver modules 140 at or near electrodes 108', as shown in FIG. 7. In certain embodiments, electrode driver 116 and receiver modules 140 may be positioned to straddle electrodes 108' (e.g., contacts 124 in the electrode driver and receiver modules are positioned on either side of isolation gaps 110 in the electrodes). As described above, receiver modules 140 may include spacers 146 that provide desired spacing such that when electrode driver 116 is properly positioned near electrode 108' (e.g., the electrode driver straddles the electrode), the receiver modules are also properly positioned with respect to the additional electrodes 108B' and 108C'.

During excitation using the embodiment of array 150, as shown in FIG. 7, electrode driver 116 may broadcast its transmission packet with contacts 124 electrically coupling the electrode driver to electrode 108A' in the excitation position. The transmission packet may be broadcast into the geological formation using electrode 108A' (and electrically connected fracture 115) as a transmission antenna. The excitation response of the geological formation may be received (e.g., received substantially simultaneously) in receiver modules 140 through electrodes 108B' and 108C'. The excitation response may be measured as a voltage drop across insulating gap 118 in each of receiver modules 140. The unique identifier in the transmission packet may be received along with the excitation response in each of the receiver modules 140. In certain embodiments, the responses received in receiver modules 140 are transmitted to electrode driver 116 (e.g., via cable 142) and stored in a memory in the electrode driver. Additional measurements may be taken by moving array 150 in the wellbore and positioning electrode driver 116 in another electrode, as described herein.

As described above, using receiver modules 140 to receive excitation responses through electrodes 108' reduces the need for the permanent installation of electronic components in the formation (e.g., in the casing or wellbore). Additionally, using receiver modules 140 may increase the reliability of logging tool 100 as malfunctioning or failing receiver modules may be repaired or replaced after removing the logging tool from the formation. Further, logging tool 100 systems (e.g., software systems) may be updated as needed via communication with receiver modules 140.

Figure 8:
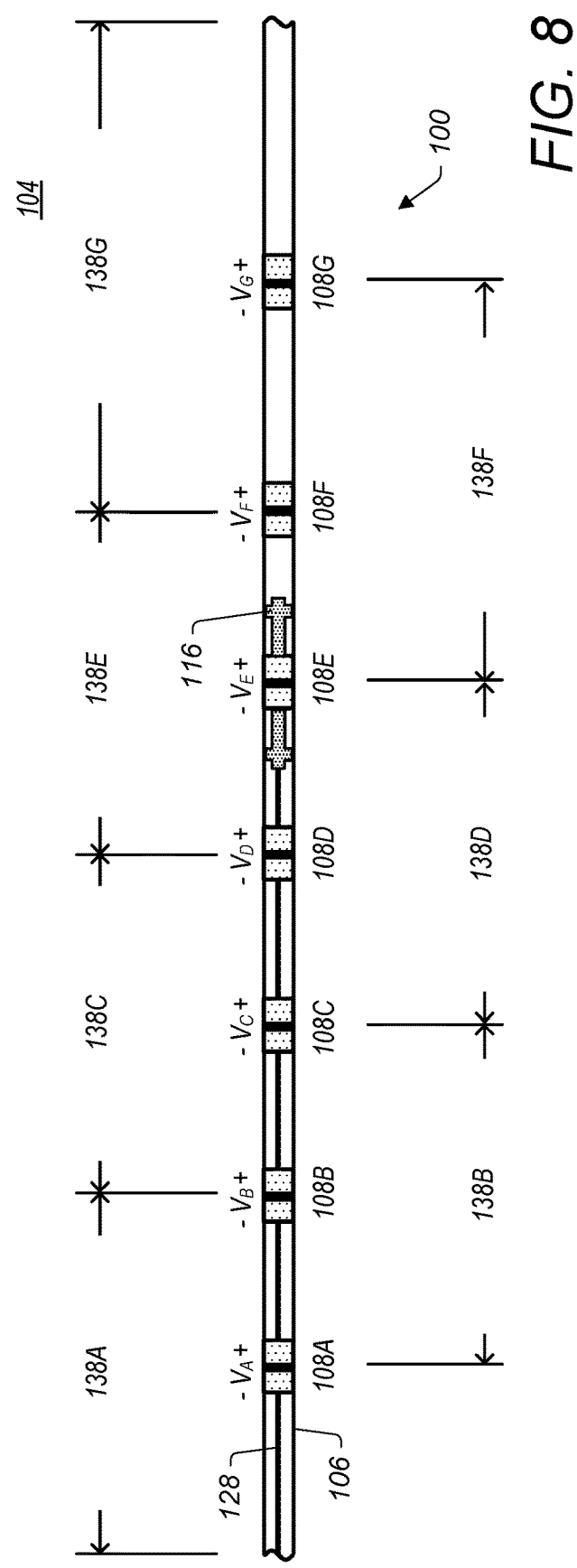
FIG. 8 depicts a schematic representation of an embodiment of electrodes transmitting and receiving signals in a geological formation.

FIG. 8 depicts a schematic representation of an embodiment of electrodes 108 transmitting and receiving signals in geological formation 104. It should be noted that while electrodes 108 are depicted in FIG. 8, electrodes 108' may also be used in the depicted embodiment with receiver modules 140 being used to receive excitation responses in association with the electrodes. As shown in FIG. 8, electrode driver 116 is positioned at electrode 108E and the combination is used to broadcast the transmission packet into zone 138E (e.g., the transmission zone associated with electrode 108E) in geological formation 104. Substantially simultaneously, electrodes 108A-D and 108F-G may receive signals (e.g., signals associated with the transmission packet) from their respective receiving zones 138A-D and 138F-G in geological formation 104. The received signals may be decoded (e.g., using transceiver module 112) and stored in the memory of each receiving electrode (e.g., a non-volatile memory in or coupled to transceiver module 112). In some embodiments, received signals may be decoded and stored in the memory of electrode driver 116. For example, transceiver modules 112 in electrodes 108A-D and 108F-G (or in receiver modules 140 associated with the electrodes) may receive, decode, and/or store the signals. In some embodiments, received signal strength indication (RSSI) values may be stored in association with the signals. In certain embodiments, fracture diagnostic measurements for zone 136E (e.g., the transmission zone associated with electrode 108E) are assessed using the signals received in electrodes 108A-D and 108F-G.

Figure 9:
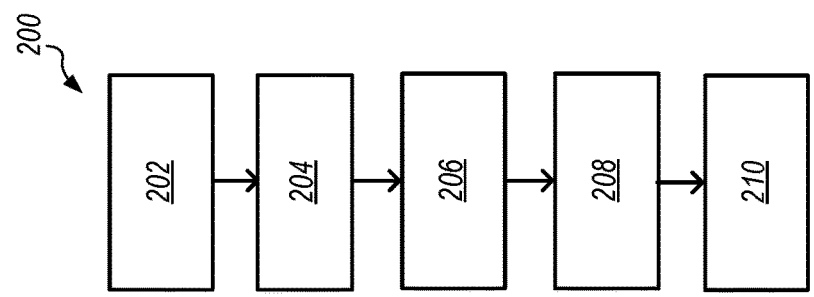
FIG. 9 depicts a flowchart representation of an embodiment of a fracture diagnostic measurement process.

FIG. 9 depicts a flowchart representation of an embodiment of fracture diagnostic measurement process 200. Process 200 may be implemented before and/or after fracturing of the formation. For example, process 200 may be implemented using BHA 126, shown in FIG. 4 or 7, and then the BHA may be used to operate fracturing of geological formation 104 at sliding sleeve locations in casing 106. Once the formation is fractured along the length of casing 106 (e.g., from the toe to the heel of the casing), process 200 may be implemented again. Implementing process 200 before and after fracturing may be used to obtain data showing changes in the formation due to the fracturing process.

Process 200 may begin with making fracture diagnostic measurements 202. In making fracture diagnostic measurements 202, electrode driver 116 (shown in FIGS. 4, 7, and 8) may be moved sequentially from electrode to electrode, starting at the heel of casing 106 (e.g., electrode 108A in FIG. 8) and ending at the toe of the casing (e.g., electrode 108G in FIG. 8). Thus, each electrode is used at least once to broadcast a transmission packet with the remaining electrodes receiving signals (and storing signal information) from each transmission. Each transmission may be identified using the broadcast zone number provided in the transmission packet (described above).

Once all the fracture diagnostic measurements are made in 202, the measurements may be downloaded in 204. In certain embodiments using electrodes 108, downloading the measurements includes sequentially downloading the stored data from each electrode 108 as electrode driver 116 passes the electrodes and storing the downloaded information in the memory of the electrode driver. The measurements may be downloaded as electrode driver 116 moves from the toe of casing 106 (e.g., electrode 108G) back to the heel of the casing (e.g., electrode 108A). In some embodiments using electrodes 108', downloading the measurements may include downloading the stored data from receiver modules 140 to electrode driver 116 either as the measurements are made or after all measurements have been made. Once the measurements are downloaded into the memory of electrode driver 116, BHA 126 may be removed from casing 106 (and the wellbore) in 206. At the surface, the measurements may be transferred from the memory of electrode driver 116 to a computational device (e.g., a laptop or other computer) in 208. Fracture diagnostics processing may then be implemented in 210.

Fracture diagnostics processing may include, but not be limited to, determining properties of one or more fractures in geological formation 104. For example, as shown in FIG. 1, properties of fractures 115 may be determined. Fractures 115 may include fractures that are connected (e.g., electrically connected) to electrodes 108. Fractures 115 may be either directly connected to electrodes 108 and/or have a proximal connection to the electrodes. In certain embodiments, fractures 115 include conductively propped fractures (e.g., fractures formed using conductive proppant). Properties that may be determined include, but are not limited to, fracture location, propped fracture length, fracture orientation, and fracture height. In certain embodiments fracture diagnostic processing includes using inversion algorithm processing and/or numerical simulation to determine properties of fractures in geological formation 104. The determined properties of the fractures may be used, for example, in optimization of hydraulic fracture treatments and reservoir management in a given treatment field.

Figure 10:
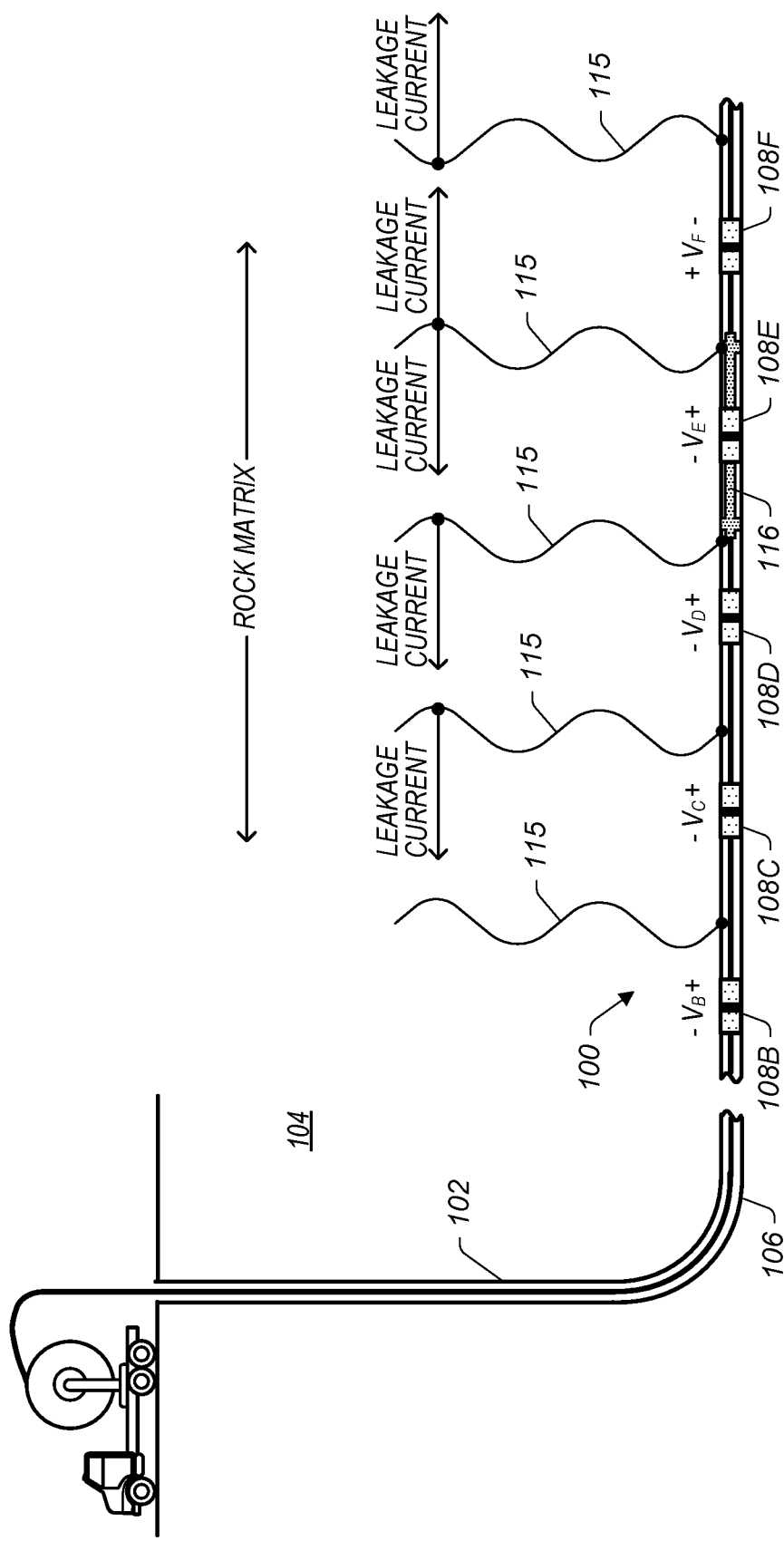
FIG. 10 depicts a representation of an embodiment of the excitation response associated with broadcast of a transmission packet from an electrode.

As shown in FIG. 8, a basic geometry of each zone may be determined by the spacing between electrodes 108 in casing 106. FIG. 10 depicts a representation of the excitation response of the conductively propped fracture/rock matrix when transmitting electrode 108E is excited by electrode driver 116. When the well is fractured using conductive proppant, the proppant forms a direct electrical connection to the casing/liner section attached to each electrode 108 of each isolation gap, forming an electrically conductive "mesh circuit" consisting of each electrode 108, each propped fracture, and the formation rock matrix surrounding each proper fracture 115. During fracture diagnostic operation, electrode driver 116 places an excitation voltage across electrode 108E (via contacts 124 and insulating gap 118 of the electrode driver), causing current to "leak" into the rock matrix via the fractures 115 of the "mesh circuit" pathway. Larger propped fractures (e.g., fractures containing more electrically conductive proppant) may cause more current to "leak" into the formation, thereby causing a greater voltage drop to be sensed between each proximal electrode 108. Logging tool 100's response to the fracture may be defined as the difference between the voltage sensed on each of the proximal electrodes 108 (receive elements) with and without the fracture's presence. For example, on each proximal electrode 108, the potential difference between two points across the electrode 108 may be computed before and after the introduction of the conductively propped fracture, and the difference between these two results may be used in assessment of fracture diagnostics in the formation.

As both the transmission electrode and the receiving electrode(s) are directly proximal to each other along the wellbore lateral and have a direct electrical connection to the conductive proppant in the propped fractures within the rock matrix, the excitation response signals may be much larger as compared to other fracture diagnostic measurement techniques including techniques utilizing indirect excitation such as an induction based conductivity measurements, or techniques where the casing is excited locally and the receive elements are located at a distance (either on the earth surface or in an adjacent wellbore). As depicted in FIG. 10, local excitation and reception using each proximal electrode 108, with each electrode 108 being directly electrically connected to each propped fracture 115, may inherently provide a much larger excitation response signal do to the direct proximity of each receive element to the transmit element. Further, with each electrode 108 being directly electrically connected to the conductive proppant, logging tool 100 may achieve much greater receive signal to noise ratios because the excitation response may be much larger due to the direct proximity of the transmission source to each receive element. A larger signal to noise ratio at each receive element means that the logging tool 100 may utilize less complex signal conditioning and signal processing techniques to recover the excitation signal, making logging tool 100 more reliable and simpler to operate and maintain.

In certain embodiments, logging tool 100 is operable at low frequencies (e.g., frequencies in a range of about 10 Hz). Low frequency operation of logging tool 100 may allow the logging tool to resolve large fracture lengths. For example, fracture lengths of 150 feet or more may be resolved using logging tool 100. As noted above, signal strengths for the larger fracture lengths are enhanced by the use of the casing or liner in direct electrical contact with the propped fractures as part of the transmission and/or receiving of signals in logging tool 100.

In certain embodiments, fracture diagnostic measurements are made using multiple broadcasts of transmission packets from a single electrode. For example, electrode 108E may provide multiple broadcasts of transmission packets that are received by electrodes 108A-D and 108F-G. In some embodiments, each broadcast may utilize a different or varied signal strength and/or carrier frequency. Using varied signal strengths and/or carrier frequencies may provide varied data that may be more useful in assessing fracture geometries.

In certain embodiments, one or more models may be used to determine design parameters for logging tool 100 (e.g., design parameters for electrodes 108 and/or electrode driver 116). The models used may include, but not be limited to, wellbore/formation/casing/fracture models such as FEKO electromagnetic simulation models. The model(s) may be used to assess logging tool 100 and its associated formation-signal propagation mechanics to assist in determining design parameters for the logging tool. Examples of design parameters that may be determined for logging tool 100 include, but are not limited to, number of active electrodes 108 needed for accurate zone fracture diagnostic measurements, electrode spacing (e.g., will spacing requirements change at toe/heel of casing), electrode geometry parameters (e.g., single gap or dual gap isolation), broadcast frequencies of transmission packets (e.g., varying frequencies may change interrogation depth and/or number of zones receiving transmission packet), transmission packet broadcast power (e.g., varying power may change interrogation depth and/or number of zones receiving transmission packet), and/or transmission packet broadcast sequence (e.g., low, mid, and high carrier frequency transmission packet broadcast at low and high power).

As described above, logging tool 100 may be controlled/operated from the surface (e.g., using control unit 117, shown in FIG. 1). In some embodiments, a communications/command infrastructure for controlling logging tool 100 includes a hardwired network topology. In some embodiments, the hardwired network topology may include a wired physical layer for the network that includes fiber optic and/or coaxial cables coupled (e.g., strapped) to casing 106 during make-up and run-in. Using the wired physical layer, however, may be difficult to handle for a rig crew and/or be expensive to implement. Additionally, the wired physical layer may be unreliable (e.g., have a short time between failures) due to the large number of physical interconnections needed to make up the wired physical layer during make-up of casing 106.

Figure 11:
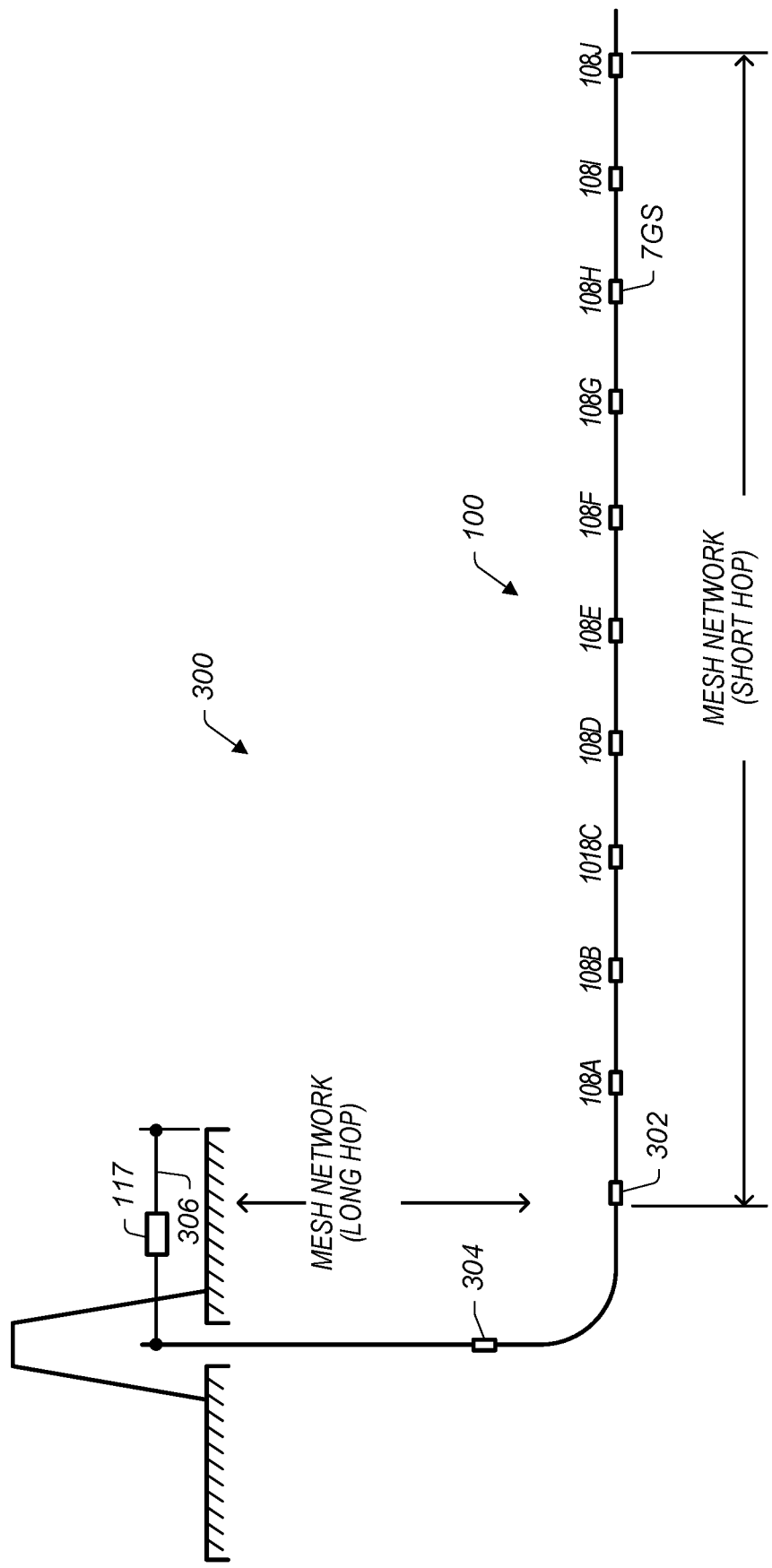
FIG. 11 depicts a schematic representation of an embodiment of a mesh network topology using a logging tool.

To overcome the issues with the wired physical layer, a low frequency wireless mesh network topology may be used, which utilizes the low frequency EM transmission capabilities of logging tool 100 (e.g., electrodes 108 and/or electrode driver 116) to provide communication capability. FIG. 11 depicts a schematic representation of an embodiment of a wireless mesh network topology 300 using logging tool 100. In topology 300, electrodes 108 may be used as low-power, EM short-hop antennas. Thus, electrodes 108 may be used to relay commands bi-directionally along casing 106 and the production zone lateral. In some embodiments, as described above, data stored in electrodes 108 (e.g., logged fracture diagnostics data) may be downloaded to electrode driver 116 through contacts 124 and the electrode drive is used to return the data to the surface. In some embodiments, wireless mesh network topology 300 is used to return data stored in electrodes 108 to the surface.

In certain embodiments, coordinator electrode 302 is positioned at or near the heel of casing 106, as shown in FIG. 11. Coordinator electrode 302 may be a high-power electromagnetic gap sub. Coordinator electrode 302 may provide a long-hop connection between electrodes 108 and control unit 117. Control unit 117 may include antenna 306 for receiving signals from coordinator electrode 302 and/or other electrodes. In some embodiments, antenna 306 includes a surface receiver electrode.

In some embodiments, repeater electrode 304 is positioned along the vertical portion of casing 106. Repeater electrode 304 may be a high-power repeating electromagnetic gap sub. Repeater electrode 304 may be used, for example, in geological formations that have unfavorable geology for transmission between coordinator electrode 302 and control unit 117 and/or formations with long distances between the coordinator electrode and the control unit.

Figure 12:
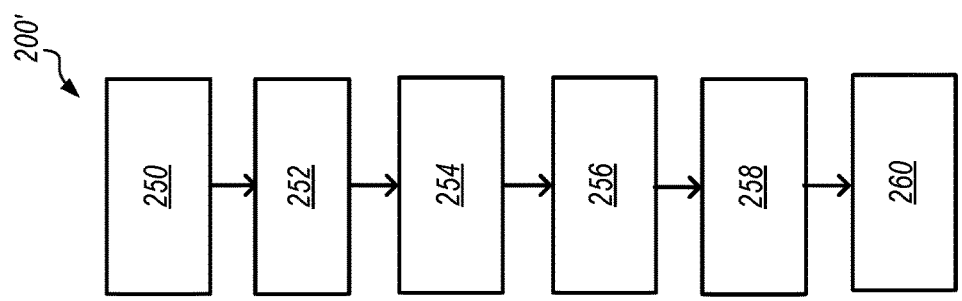
FIG. 12 depicts a flowchart representation of an embodiment of a fracture diagnostic measurement process utilizing mesh network topology.

In some embodiments, a fracture diagnostic process utilizes wireless mesh network topology 300 in addition to logging tool 100. FIG. 12 depicts a flowchart representation of an embodiment of fracture diagnostic measurement process 200' utilizing wireless mesh network topology 300. In 250, electrode driver 116 may be moved to a target zone electrode 108. In 252, the target zone number may be downlinked from control unit 117. The downlink signal may be received by coordinator electrode 302 from control unit 117 and then short-hopped to the target zone electrode 108. In some embodiments, the signal is downlinked from control unit 117 at a lower frequency than the signal is short-hopped from coordinator electrode 302 to the target zone electrode 108. For example, downlink from control unit 117 to coordinator electrode 302 may be in a range of about 2 Hz to about 12 Hz while short-hop from the coordinator electrode to the target zone electrode 108 may be in a range of about 20 Hz to about 100 Hz.

In 254, the target zone electrode 108 may query electrode driver 116 to verify a direct-connection and communication link between the electrode and the electrode driver via the contacts (e.g., the bow spring contacts). The query in 254 may be used to confirm that electrode driver 116 is positioned at the correct electrode 108 within casing 106.

In 256, control unit 117 may downlink a "start" command to the target zone electrode 108 to initiate broadcasting and begin the fracture diagnostics measurement sequence for the target zone electrode. The "start" command may be further communicated to electrode driver 116, which may begin broadcasting the transmission packet. The transmission packet may include the target zone number for target zone electrode 108. In 258, similar to embodiments described above, during broadcasting of the transmission packet, the remaining electrodes 108 along casing 106 may receive and store information/data related to the transmission packet. In some embodiments, the received data may be transmitted to the surface using wireless mesh network topology 300. Using wireless mesh network topology 300 to transmit data to the surface provides a through-the-earth wireless communication pathway for the data.

Once the fracture diagnostics measurements for the target zone electrode 108 are completed, electrode driver 116 may uplink a "finish" command, in 260, to control unit 117 via the target zone electrode and coordinator electrode 302. After the "finish" command is received, electrode driver 116 may be moved to another target zone and process 200' may be repeated at the new target zone.

Figure 13:
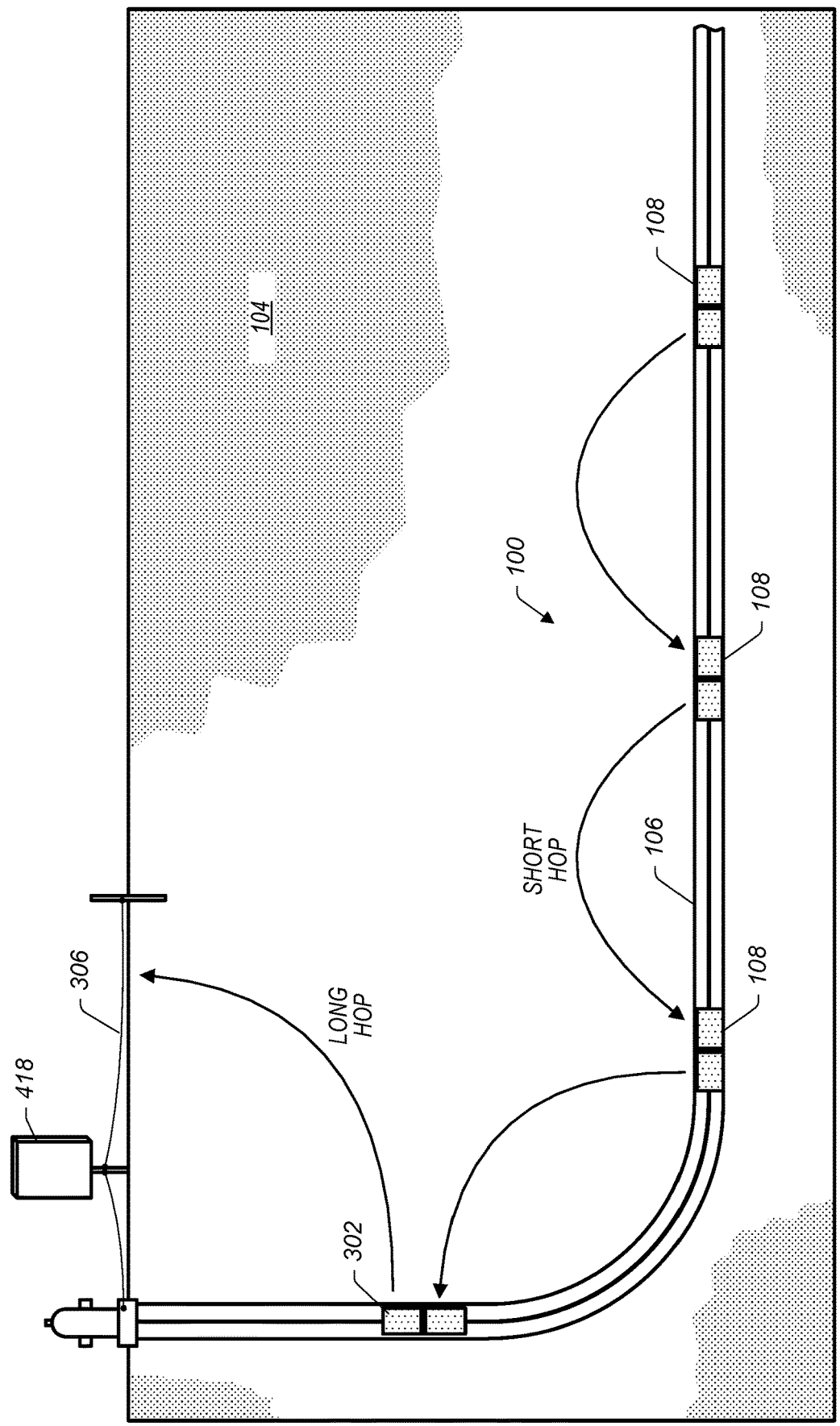
FIG. 13 depicts a representation of an embodiment of a logging tool used for long-term production monitoring in a geological formation.

In some embodiments, logging tool 100 may be used for long-term production monitoring. FIG. 13 depicts a representation of an embodiment of logging tool 100 used for long-term production monitoring in geological formation 104. For production monitoring, each electrode 108 may include a low-power measurement sensor package (e.g., one or more sensors) that is used to monitor well production parameters such as temperature and/or pressure. The sensor package may be coupled to transceiver module 112. Transceiver module 112 may be programmed to periodically wake-up and gather production information (e.g., assess temperature and/or pressure). In such embodiments, transceiver module 112 may be designed for ultra-low power, wake/sleep mode operations to allow production measurements to be periodically obtained and relayed to the surface over extended periods of time (e.g., time periods up to about 3 years).

Figure 14:
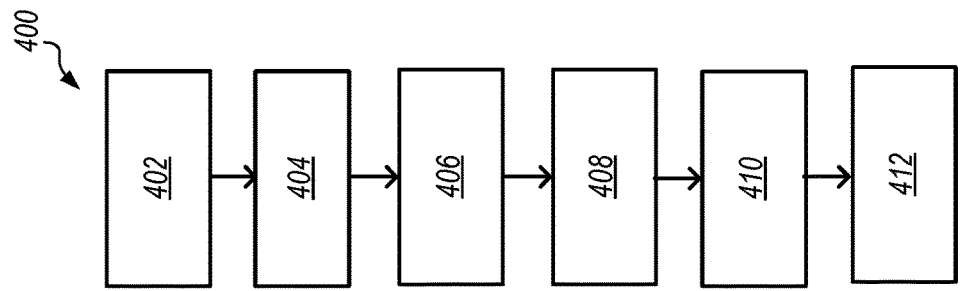
FIG. 14 depicts a flowchart representation of an embodiment of a production monitoring process.

FIG. 14 depicts a flowchart representation of an embodiment of production monitoring process 400. In 402, coordinator electrode 302 may wake up according to an internal clock schedule (e.g., an internal real-time clock (RTC) logging event schedule). In 404, coordinator electrode 302 may provide a wake-up command to one or more electrodes 308 (e.g., via the short-hop network of wireless mesh network topology 300). In 406, electrodes 308 may wake up and turn on the sensor package to record production data (e.g., temperature and/or pressure data). In 408, electrodes 108 may provide the production data (via the short-hop network) to coordinator electrode 302. Electrodes 108 may then power down and return to a low-power sleep state.

In certain embodiments, in 410, coordinator electrode 302 may assess the received production data. For example, coordinator electrode 302 may consolidate the data and compress the data. Coordinator electrode 302 may then provide the data to monitoring unit 418 (shown in FIG. 13) via, for example, the long-hop network through formation 104. Coordinator electrode 302 may then return to its low-power sleep state. In some embodiments, in 412, monitoring unit 418 may provide the data to a central production monitoring facility (not shown). For example, monitoring unit 418 may provide the data over a cellular or Internet network link.

Figure 15:
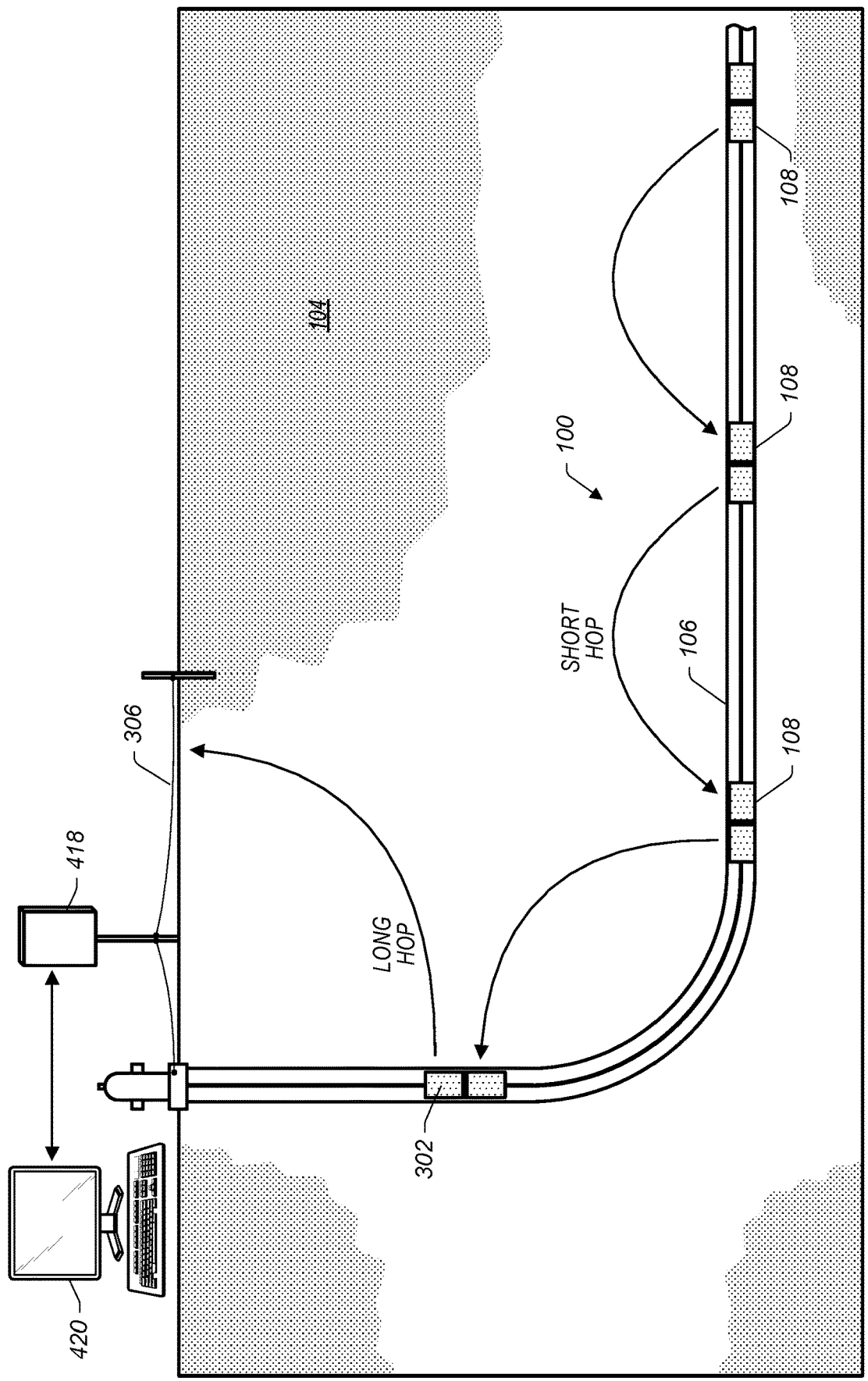
FIG. 15 depicts a representation of an embodiment of a logging tool used for cross-well fracture event monitoring in a geological formation.

In some embodiments, logging tool 100 is used in a cross-well fracture event monitoring process. FIG. 15 depicts a representation of an embodiment of logging tool 100 used for cross-well fracture event monitoring in geological formation 104. For cross-well fracture event monitoring, monitoring unit 418 may be coupled to surface transmitter unit 420. Surface transmitter unit 420 may be used to transmit a "special event" downlink command to the network of electrodes 108 and coordinator electrode 302 to initiate cross-well fracture monitoring in geological formation 104 using logging tool 100. Surface transmitter unit 420 may be, for example, a surface dipole antenna installation.

Figure 16:
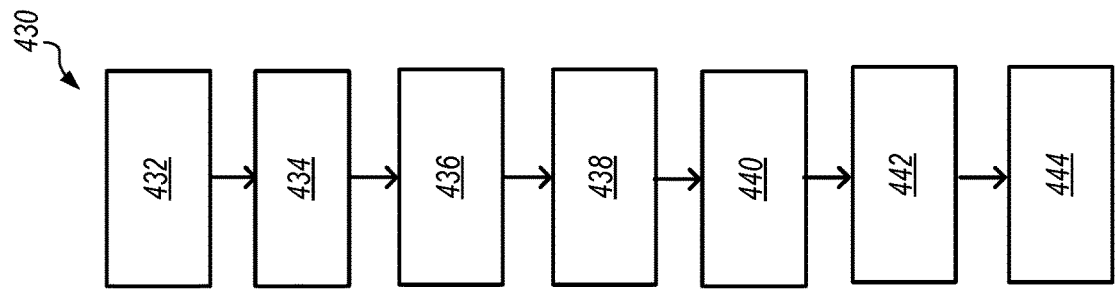
FIG. 16 depicts a flowchart representation of an embodiment of a cross-well fracture event monitoring process.

FIG. 16 depicts a flowchart representation of an embodiment of cross-well fracture event monitoring process 430. In 432, surface transmitter unit 420 may be coupled to monitoring unit 418. In 434, surface transmitter unit 420 may provide the "special event" command to coordinator electrode 302 via monitoring unit 418 and the long-hop network in geological formation 104. In 436, coordinator electrode 302 may wake up and provide the "special event" command to electrodes 108 via the short-hop network.

In 438, electrodes 108 may wake up and power-up the sensor package to begin assessing cross-well fracture data. In certain embodiments, assessing cross-well fracture data includes using electrodes 108 to receive transmission packets broadcast by an electrode (and electrode driver) located in another wellbore in geological formation 104. In 440, electrodes 108 may provide the fracture data to coordinator electrode 302 via the short-hop network and then power down into a low-power state.

In certain embodiments, in 442, coordinator electrode 302 may assess the received fracture data. For example, coordinator electrode 302 may consolidate the data and compress the data. Coordinator electrode 302 may then provide the data to monitoring unit 418 via, for example, the long-hop network through formation 104. Coordinator electrode 302 may then return to its low-power sleep state. In 444, monitoring unit 418 may provide the data to surface transmitter unit 420. Surface transmitter unit 420 may then store the provided data and/or assess the provided data as needed.

In certain embodiments, one or more process steps described herein may be performed by one or more processors (e.g., a computer processor) executing instructions stored on a non-transitory computer-readable medium. For example, communication between electrodes 108, coordinator electrode 302, control unit 117, and/or other devices described herein may have one or more steps performed by one or more processors executing instructions stored as program instructions in a computer readable storage medium (e.g., a non-transitory computer readable storage medium). In certain embodiments, electrodes 108, coordinator electrode 302, control unit 117, and/or other devices described herein include program instructions in the computer readable storage medium.

Figure 17:
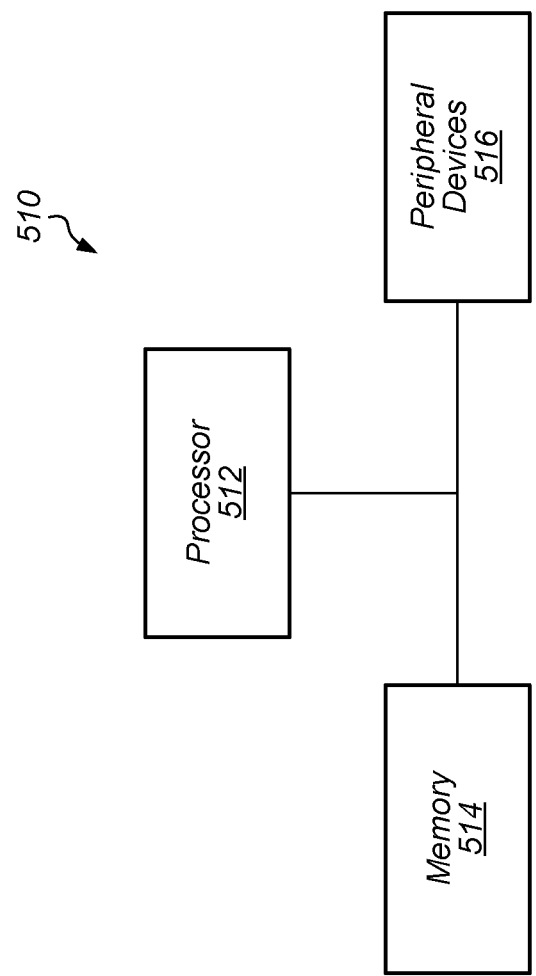
FIG. 17 depicts a block diagram of one embodiment of an exemplary computer system.

FIG. 17 depicts a block diagram of one embodiment of exemplary computer system 510. Exemplary computer system 510 may be used to implement one or more embodiments described herein. In some embodiments, computer system 510 is operable by a user to implement one or more embodiments described herein. In the embodiment of FIG. 17, computer system 510 includes processor 512, memory 514, and various peripheral devices 516. Processor 512 is coupled to memory 514 and peripheral devices 516. Processor 512 is configured to execute instructions, including the instructions for communication, which may be in software. In various embodiments, processor 512 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, computer system 510 may include more than one processor. Moreover, processor 512 may include one or more processors or one or more processor cores.

Processor 512 may be coupled to memory 514 and peripheral devices 516 in any desired fashion. For example, in some embodiments, processor 512 may be coupled to memory 514 and/or peripheral devices 516 via various interconnect. Alternatively or in addition, one or more bridge chips may be used to coupled processor 512, memory 514, and peripheral devices 516.

Memory 514 may comprise any type of memory system. For example, memory 514 may comprise DRAM, and more particularly double data rate (DDR) SDRAM, RDRAM, etc. A memory controller may be included to interface to memory 514, and/or processor 512 may include a memory controller. Memory 514 may store the instructions to be executed by processor 512 during use, data to be operated upon by the processor during use, etc.

Figure 18:
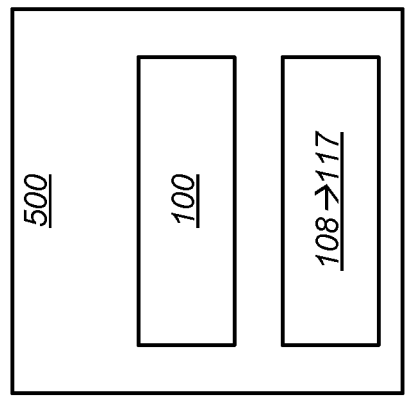
FIG. 18 depicts a block diagram of one embodiment of a computer accessible storage medium.

Peripheral devices 516 may represent any sort of hardware devices that may be included in computer system 510 or coupled thereto (e.g., storage devices, optionally including computer accessible storage medium 500, shown in FIG. 18, other input/output (I/O) devices such as video hardware, audio hardware, user interface devices, networking hardware, etc.).

Turning now to FIG. 18, a block diagram of one embodiment of computer accessible storage medium 500 including one or more data structures representative of logging tool 100 (depicted in FIG. 1) included in an integrated circuit design and one or more code sequences representative of communication between electrodes 108 and control unit 117 (shown in FIG. 1). Each code sequence may include one or more instructions, which when executed by a processor in a computer, implement the operations described for the corresponding code sequence. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 500 may store data in a non-transitory manner, where non-transitory in this context may refer to not transmitting the instructions/data on a signal. For example, non-transitory storage may be volatile (and may lose the stored instructions/data in response to a power down) or non-volatile.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs (field programmable gate arrays).

In some embodiments, a non-transitory computer-readable memory medium may be configured so that it stores program instructions and/or data, where the program instructions, if executed by a computer system, cause the computer system to perform a method, e.g., any method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A method for assessing one or more properties of a geological formation, comprising:
   energizing a first electrode, the first electrode being part of a casing in a wellbore in the formation, wherein the first electrode comprises two conductive portions that are electrically separated, wherein energizing the first electrode provides an excitation stimulus into the formation;
   receiving, in a plurality of second electrodes, excitation responses from the formation, the excitation responses being responses to the excitation stimulus, wherein the second electrodes are part of the casing in the wellbore in the formation, and wherein at least one of the second electrodes comprises two conductive portions that are electrically separated; and
   assessing the excitation responses to determine one or more physical properties of at least one fracture in the formation, the at least one fracture being propped with conductive proppant that is electrically connected to the first electrode.

2. The method of claim 1, wherein the two conductive portions in the first electrode are electrically separated by an isolation gap in the casing.

3. The method of claim 1, wherein the first electrode and the second electrodes form an array of electrodes in the casing in the wellbore.

4. The method of claim 1, further comprising:
   energizing at least one of the second electrodes, wherein energizing the at least one second electrode provides an excitation stimulus into the formation;
   receiving, in the remaining second electrodes and the first electrode, excitation responses from the formation, the excitation responses being responses to the excitation stimulus; and
   assessing the excitation responses to determine one or more physical properties of at least one additional fracture in the formation, the at least one additional fracture being propped with conductive proppant that is electrically connected to the at least one energized second electrode.

5. The method of claim 4, further comprising sequentially energizing each of the remaining second electrodes while substantially simultaneously receiving, in the non-energized second electrodes and the first electrode, excitation responses from the formation, and assessing one or more physical properties of a fractured volume of the formation based on the received excitation responses.

6. The method of claim 1, further comprising assessing the excitation responses using one or more circuit modules located in at least one of the second electrodes.

7. The method of claim 6, further comprising storing the assessed excitation responses in one or more memories located in at least one of the second electrodes.

8. The method of claim 6, further comprising providing power to the circuit modules using batteries positioned in at least one of the second electrodes.

9. The method of claim 6, further comprising providing power to the circuit modules using a rechargeable energy source positioned in at least one of the second electrodes.

10. The method of claim 9, further comprising providing a recharging device from a surface of the formation into the wellbore to selectively recharge the rechargeable energy source in one or more of the second electrodes.

11. The method of claim 1, wherein assessing the excitation responses comprises operating at least one of a numerical simulation or an inversion algorithm to determine the one or more physical properties of the at least one fracture in the formation.

12. The method of claim 1, further comprising providing an electrode driver into the wellbore to energize the first electrode.

13. The method of claim 12, wherein the electrode driver is movable within the casing to position the electrode driver at or near the first electrode.

14. The method of claim 12, further comprising receiving the excitation responses from the second electrodes in one or more receiver modules coupled to the electrode driver.

15. The method of claim 14, further comprising assessing the excitation responses using one or more circuit modules located in the electrode driver.

16. The method of claim 14, further comprising storing the assessed excitation responses in one or more memories located in the electrode driver.

17. The method of claim 1, further comprising providing a device into the casing to retrieve the assessed excitation responses from the second electrodes.

18. The method of claim 1, further comprising using through-the-earth wireless communication to provide the assessed excitation responses to a surface location.

19. The method of claim 1, further comprising providing a unique identifier in the excitation stimulus, the unique identifier identifying the energized first electrode providing the excitation stimulus.

20. The method of claim 19, wherein the unique identifier is received in the excitation responses received by the second electrodes.

21. The method of claim 20, further comprising associating the unique identifier with the assessed excitation responses.

22. The method of claim 1, further comprising assessing temperature and/or pressure in the wellbore using one or more sensors coupled to at least one of the first or second electrodes.

23. A system configured to assess one or more properties of a geological formation, comprising:
   a casing in a wellbore in the formation, the casing comprising a plurality of electrodes, wherein each electrode comprises two conductive portions that are electrically separated, and wherein each electrode is positioned at or near a fracturing point in the wellbore; and
   an electrode driver configured to be moved within the casing, wherein the electrode driver is configured to energize an electrode when the electrode driver is positioned at or near the electrode;
   wherein the electrodes are configured to be sequentially energized to provide excitation stimulus into the formation while substantially simultaneously receiving, in non-energized electrodes, excitation responses to the excitation stimulus from the formation; and
   wherein the system is configured to assess one or more physical properties of a fractured volume of the formation based on the received excitation responses.

24. The system of claim 23, wherein the two conductive portions in the electrodes are electrically separated by an isolation gap.

25. The system of claim 23, wherein the electrodes are evenly spaced along a length of the casing.

26. The system of claim 23, wherein each electrode comprises a transceiver module positioned in at least one of the conductive portions, and wherein the transceiver module is configured to receive the excitation responses.

27. The system of claim 23, further comprising one or more receiver modules coupled to the electrode driver, the receiver modules being configured to receive the excitation responses and transmit the excitation responses to the electrode driver.

* * * * *